United States Patent [19]
Okazima

[11] 3,984,119
[45] Oct. 5, 1976

[54] SUSPENSION FOR TWO-WHEELED VEHICLE

[76] Inventor: Kenzo Okazima, No. 2637, Dota, Kani-cho, Kani, Gifu, Japan

[22] Filed: Sept. 16, 1974

[21] Appl. No.: 506,463

Related U.S. Application Data

[63] Continuation of Ser. No. 279,222, Aug. 9, 1972, abandoned.

[30] Foreign Application Priority Data

Aug. 10, 1971 Japan .................................. 46-59915

[52] U.S. Cl. ............................. 280/276; 267/177; 280/284
[51] Int. Cl.² ........................................ B62K 17/00
[58] Field of Search .................... 280/275, 276, 284; 267/8 R, 34, 60, 61 R, 61 S, 166, 169, 170, 172, 177

[56] References Cited
UNITED STATES PATENTS

| | | | |
|---|---|---|---|
| 783,236 | 2/1905 | Ashburn | 280/276 |
| 1,188,168 | 6/1916 | Genovese | 280/276 |
| 3,559,976 | 2/1971 | Jerz | 267/61 R |
| 3,618,927 | 11/1971 | Nicholls | 267/8 R |

FOREIGN PATENTS OR APPLICATIONS

| 143,774 | 1/1954 | Sweden | 280/276 |
|---|---|---|---|

Primary Examiner—Evon C. Blunk
Assistant Examiner—Joseph E. Valenza
Attorney, Agent, or Firm—Saul Jecies

[57] ABSTRACT

A suspension for two-wheeled vehicles is provided which may arbitrarily adjust its spring characteristics almost without changing the initial load applied to the suspension spring so that the optimum spring characteristics may be selected depending upon the desired riding quality or road conditions. A pair of series-disposed helical or coil springs are fitted over a telescopic shock absorber and are spaced apart from each other by a spacer whose position with respect to the shock absorber is adjustable and which is retained in position by a stopper securely fitted over the shock absorber. The pair of helical springs have different forces, that is the load causing the maximum deflection of one helical spring is different from that causing the maximum deflection of the other helical spring. By the coaction between the spacer and the stopper and by a mechanism for causing the axial displacement of one of the spring seats fitted over the shock absorber, the preload applied to one of the pair of helical springs may be so adjusted as to be equal to or in excess of the load applied to the other helical spring.

12 Claims, 10 Drawing Figures

SUSPENSION FOR TWO-WHEELED VEHICLE

This application is a continuation of Ser. No. 279,222 filed Aug. 9, 1972 now abandoned.

BACKGROUND OF THE INVENTION

The present invention relates to generally a suspension for two-wheeled vehicles and more particularly a front fork or rear damper or suspension for suspending a front or rear wheel of a motorcycle.

In general, a front fork or rear damper of a motorcycle comprises telescopic shock absorbers and suspension springs. The front or rear wheel of the motorcycle is suspended by the suspension springs, and the oscillations of the suspended springs are absorbed by the telescopic shock absorbers. The road shock caused by the passage of the wheels over irregularities is absorbed by the front fork and the rear damper within a relatively shorter time. In this case, the frequency of oscillation is dependent upon the load applied to the suspension springs and also upon the spring constants of the suspension springs, so that the oscillation of the motorcycle with the front fork and rear damper to which are applied the heavy loads or which have the soft suspension springs is shorter than that of the motorcycle with the front fork and rear damper to which are applied the light loads or which have the stiff suspension springs.

In all of the front forks and rear dampers of the type described, the compression and expansion strokes of the suspension springs are limited to a predetermined distance from the standpoint of design of a motorcycle. It is therefore required that the suspension springs must deflect or compress within a predetermined compression stroke when the load in a predetermined range is applied. In view of the above, the suspension springs used in the front forks and rear dampers must have as smallest a spring constant as possible.

The rate of deflection of a helical spring is generally determined uniquely depending upon its spring constant, and remains unchanged in the whole stroke. Therefore, if the coil spring with a small spring constant is used in order to attain the desired spring characteristics within a predetermined load range, the riding quality is improved but the helical spring tends most often to be most compressed and most expanded. As a result the suspension springs are over-compressed and readily reach the limits of the stroke, over-expanded, thus resulting in the poor riding quality. To overcome this problem there have been proposed various methods which generally provide the non-linear spring characteristics. In one method, a coil spring has different diameters and pitches of coils throughout its whole length. In another method, a plurality of helical springs are disposed in parallel or in series so that the spring constant as a whole may be varied depending upon the load. However, even if it is possible to raise steeply the load-deflection curve when the suspension spring is compressed it is impossible to raise the curve when the suspension spring is expanded so that the problem of over-expansion cannot be overcomed.

Furthermore, the ratio of the weight of a driver and/or passenger to that of the motorcycle is extremely larger compared with the four-wheeled vehicles or the like so that in order to provide the satisfactory displacement of the load, the helical springs of the front forks and rear dampers must have a high spring constant. This results in the undesired high frequency of oscillation when the load is light. To overcome this problem, there has been devised and demonstrated a suspension system in which a present load may be externally adjustable depending upon the loads applied to the front fork and rear dampers so that the spring constant of the helical spring may be maintained at relatively small magnitude under all load conditions. Even though the better riding quality may be maintained in the wide range of loads by changing the initial loads applied to the coil springs, the spring constant remains unchanged. Therefore, when the load is heavy so that the initial load applied to the helical springs are increased, the reaction of the springs is increased but the over-expansion of the springs cannot be prevented, thus bringing about the problems of impact and noise.

SUMMARY OF THE INVENTION

In view of the above, the present invention provides an improvement of a front fork and rear damper for a two-wheeled vehicle which is capable of overcoming the problems and defects encounted in the prior art front forks and dampers. In brief, the present invention is characterized in that a first helical coil and a second helical coil are disposed in series with a spacer interposed therebetween, the load causing the maximum deflection of the first helical spring being different from that of the second helical spring, and said spacer is varied and retained in position by a stopper so that a predetermined preload may be applied to the second helical spring, whereby the preload applied to the second helical spring may be adjusted depending upon the position of the stopper or by means which is adapted to change the position of the end remote from said spacer of the second helical group. Therefore in the front fork or rear damper in accordance with the present invention, under the normal load condition the first helical spring, whose initial load is smaller, starts to compress from the fully expanded state so that the overall spring constant of the suspension spring is that of the first helical spring. When the load applied to the first helical spring is in excess of the initial load applied to the second helical spring, both first and second helical springs are compressed so that the suspension spring has a spring constant which is a combination of the spring constants of the first and second helical springs. When the first or second helical spring is completely compressed, the suspension spring has a spring constant equal to that of the other helical spring. Therefore, the load-deflection curve of the suspension spring in accordance with the present invention may be raised steeply towards the ends of compression and expansion strokes. Furthermore, the preload applied to the second helical spring may be varied by changing the position of the stopper and/or by displacing the spring seat retaining the end remote from the spacer or stopper of the second helical spring so that the spring characteristics of the suspension spring may be varied without the initial load applied thereto being changed at all. Therefore, depending upon the load and road conditions, the optimum spring characeistics are attained and the over-compression and over-expansion may be prevented. Furthermore, the natural frequency of oscillation may be reduced. Thus, the riding quality may be much enhanced.

The above and other objects, features and advantages of the present invention will become more apparent from the following description of some preferred embodiments thereof taken in conjunction with the accompanying drawing.

DESCRIPTION OF THE PREFERRED EMBODIMENTS

Figure 1:
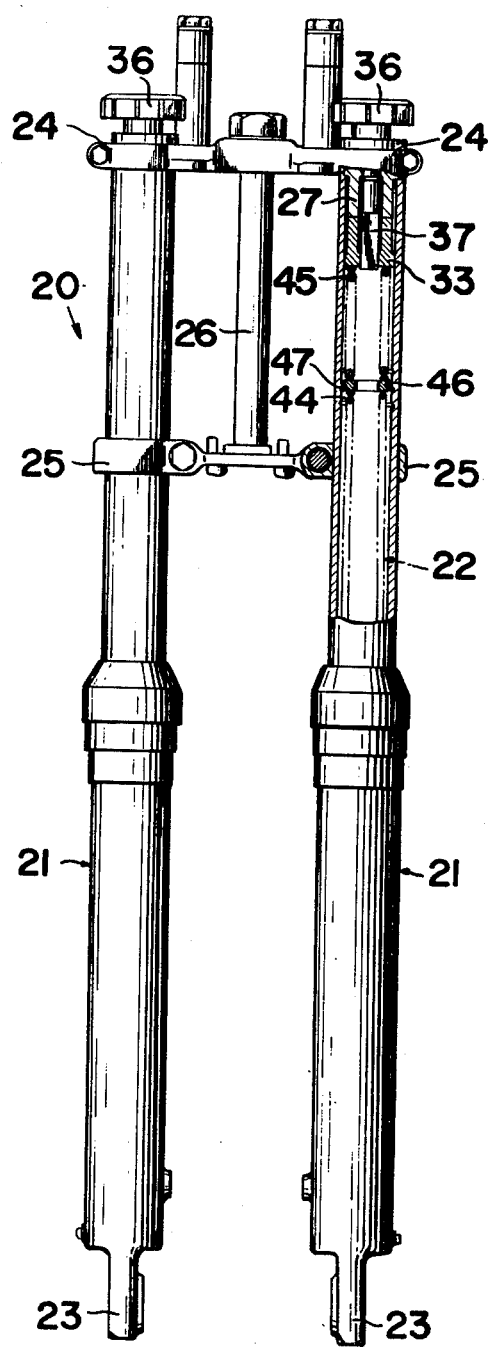
FIG. 1 is a front view, partly in section, of a first embodiment of a front fork for a motorcycle in accordance with the present invention.
Figure 2:
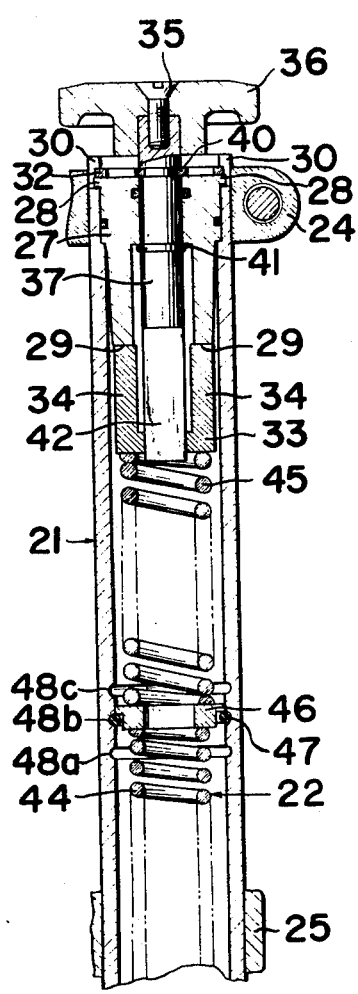
FIG. 2 is a cross sectional view illustrating only the upper portion thereof.
Figure 3:
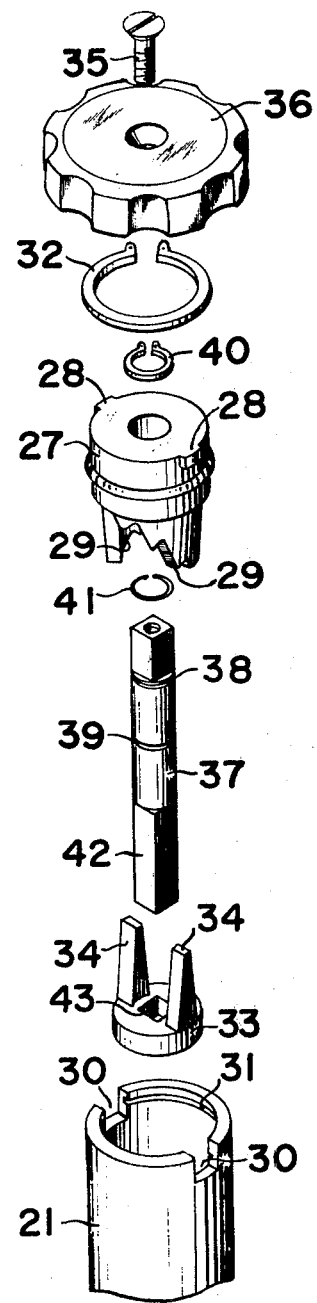
FIG. 3 is a perspective exploded view of a mechanism for adjusting the preload applied to a second helical spring.

First Embodiment, FIGS. 1–3

Referring to FIG. 1, a front fork generally designated by 20 of a two-wheeled vehicle generally comprises a pair of spaced apart telescopic shock absorbers 21 each having a suspension spring 22 housed therein. A front wheel is supported between a pair of axle brackets 23 formed at the lower ends of the telescopic shock absorbers 21. The front fork 20 is rotatably fixed to the frame of the motorcycle through a steering shaft 26 extending between an upper bracket 24 connecting the upper ends of the telescopic shock absorbers 21 and a lower bracket 25.

The suspension springs 22 serve to resiliently suspend the front wheel with respect to the frame, and the telescopic shock absorbers 21 serve to reduce the oscillation or jolts of the front wheel caused by the irregularities of the road surface.

Referring to FIGS. 2 and 3, a cap 27 is fitted into the upper opening of the shock absorber 21. The cap 27 has a pair of projections 28 extending radially outwardly from the upper end thereof and a stepped cam surface 29 formed at the lower portion thereof. The pair of projections 28 engage with a pair of recesses 30 formed at the upper end of the telescopic shock absorber 21, and a snap ring 32 is fitted into an annular groove 31 formed in the inner wall of the telescopic shock absorber 21, whereby the cap 27 may be securely fitted into the shock absorber 21 and made integral therewith.

A pair of legs 34 extending from a cam set 33 disposed immediately below the cap 27 are made into contact with the stepped cam surfaces 29 of the cap 27.

An adjusting rod 37 whose upper end is securely fixed to a knob 37 with a screw 35 is rotatably fitted into the shock absorber 21 through a center hole of the cap 27. The cap 27 is interposed between a pair of upper and lower snap rings 40 and 41 fitted into annular grooves 38 and 39 formed in the adjusting rod 27 so that the latter may be prevented from being pulled out of the shock absorber 21. A rectangular lower portion 42 of the adjusting rod 37 is fitted into a rectangular hole 43 formed in the cam seat 33 so that the latter may be rotated in unison with the adjusting rod 37.

The suspension spring 22 comprises a first helical spring 44 and a second helical spring 45 whose spring force is different from that of the first spring 44. These first and second helical springs 44 and 45 are disposed in series with a spacer 46 interposed therebetween. As best shown in FIG. 2, the first helical spring 44 is loaded between the bottom of the shock absorber 21 and the undersurface of the spacer 46 whereas the second helical spring 45 between the upper surface of the spacer 46 and the undersurface of the cam seat 33 so that the pair of legs 34 of the cam seat 33 may be normally made into engagement with the stepped cam surfaces 29 of the cap 27.

A stopper 47 which serves to support the spacer 46 may be selectively fitted into one of a plurality of annular grooves 48a, 48b and 48c formed in the inner wall of the shock absorber 21 so that the position of the spacer 46 may be appropriately selected.

Therefore, by the appropriate selection of the position of the stopper 47 or by the vertical displacement of the cam seat 33 which is caused by rotating the knob 36 to rotate the cam seat thereby changing the relative position of the legs 34 with respect to the cam surfaces 29 of the cap 27, the second helical spring 45 may be pre-loaded or the preload of the second helical spring 45 may be appropriately varied.

Next the mode of operation will be described. The first helical spring 44 is so selected that the load which causes the maximum deflection or compression of the first helical spring 44 is greater than that applied to the second helical spring 45 causing the maximum deflection or compression thereof. The knob 36 is so rotated that the legs 34 of the cam seat 33 are located at the intermediate between the upper and lower ends of the stepped cam surfaces 29 of the cap 27. The stopper 47 is fitted into the middle annular groove 48b and abutted by the spacer 46 which can move downwardly to but not beyond the stopper 47. Thus, the second helical spring 45 is so preloaded that it is compressed to one half of its full compression stroke.

Figure 5:
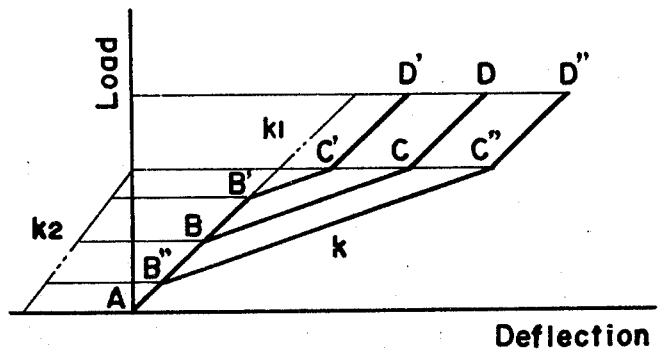
FIGS. 5–10 are graphs illustrating the relation between the load and deflection of the suspension spring under various preadjusted or preloaded conditions.

Before the load applied to the first helical spring 44 reaches the preload of the second helical spring 45, that is between the points A and B in FIG. 5, the spacer 46 is pressed against the stopper 47 under the force of the second helical spring 45, and the second helical spring 45 will not deflect at all while only the first helical spring 44 is compressed between the bottom of the shock absorber 31 and the spacer 46. As far as the above described conditions remain unchanged, the spring constant of the suspension spring 22 equals the spring constant $k_1$ of the first helical spring 44.

When the load applied to the first helical spring 44 is in excess of the preload of the second helical spring 45, the latter is compressed together with the former so that the spacer 46 is moved upwardly away from the stopper 47. Therefore the spring constant of the suspension spring 22 is given by $$k = \frac{k_1 \cdot k_2}{k_1 + k_2}$$

where $k_2$ is a spring constant of the second helical spring 45. Therefore, between the point B in FIG. 1 to the point C at which the load applied to the first helical spring 44 equals the maximum load applied to the second helical spring 45 for causing the maximum deflection thereof, the spring constant of the suspension spring 22 is smaller than the spring constant $k_1$ of the first helical spring 44.

Thereafter, the second helical spring 45 is completely compressed while only the first helical spring 44 is being compressed. As a result, between the point C and the point D at which the first helical spring 44 is completely compressed, the spring constant of the suspension spring 22 equals the spring constant $k_1$ of the first helical spring 44.

Same is true even when the preload applied to the second helical spring 45 is varied by rotating the knob 36. That is, when the preload applied to the second helical spring 45 is increased by rotating the knob 36 so as to cause the cam seat 33 to move downwardly, the suspension spring has the characteristic curve A-B'-C'-D'. On the other hand, when the preload applied to the second helical spring 45 is reduced by rotating the knob 36 in the reverse direction so as to cause the cam seat 33 to move upwardly, the suspension spring has the characteristic curve A-B''-C''-D'' shown in FIG. 5.

From the foregoing description it is seen that the suspension spring 22 housed in the front fork 20 has a large spring constant when it is close to both ends of its stroke, that is at one end at which the suspension spring is fully extended and at the other end at which the suspension spring is completely compressed, but the suspension spring 22 has a small spring constant, that is a very soft spring action midway between these ends. Thus, the suspension spring 22, which cooperates with the telescopic shock absorbers 21, may prevent the sudden and excessive pitching down and up of the motorcycle, thereby improving the riding quality. Furthermore, the spring characteristic of the suspension spring 22 may be suitably varied without affecting the initial load applied to the suspension spring 22 depending upon the load and riding or road conditions so that the impact and noise caused when the suspension spring 22 is suddenly fully extended may be minimized.

Figure 8:
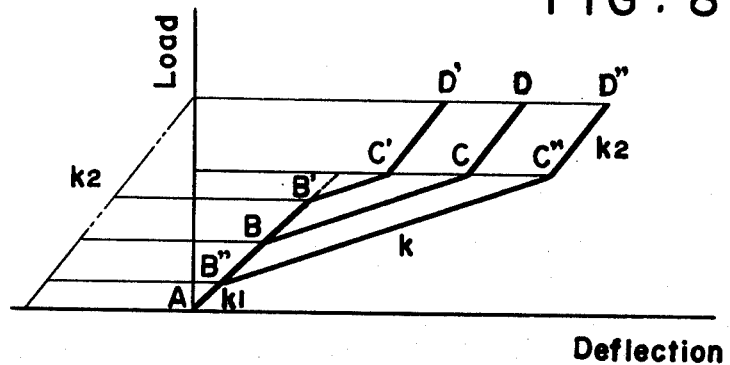

In the first embodiment, the load which causes the maximum deflection of the first helical spring 44 is greater than the load causing the maximum deflection of the second helical spring 45, but it will be understood that the load which causes the maximum deflection of the second helical spring 45 may also be so selected as to be greater than the load causing the maximum deflection of the first helical spring. In this case, as shown in FIG. 8, the suspension spring 22 has a spring constant equal to the spring $k_1$ constant of the first helical spring 44 when the suspension spring is extended, but has a spring constant equal to the spring constant $k_2$ of the second helical spring 45 when the suspension spring 22 is compressed.

Figure 6:
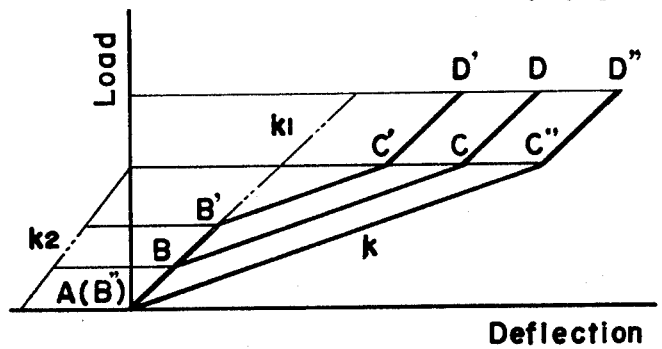
Figure 7:
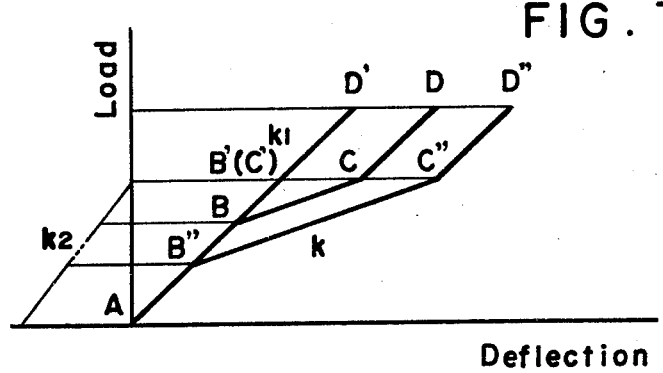
Figure 9:
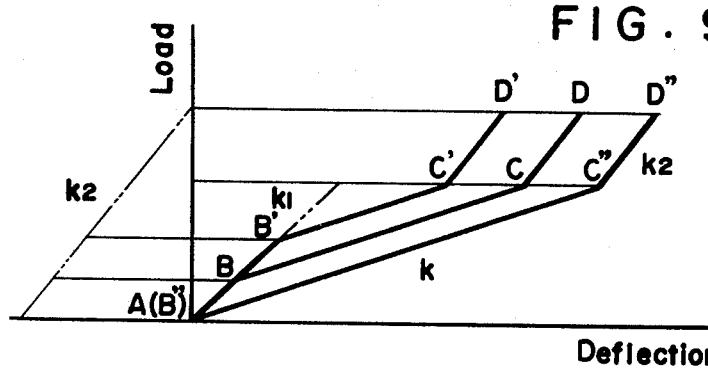
Figure 10:
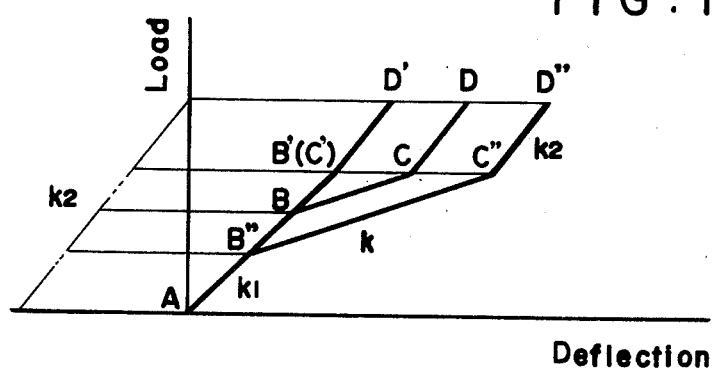

So far the nob 36 is rotated to vary the preload applied to the second helical deflection 45, thereby varying the spring characteristic of the suspension spring 22, but it is also possible to vary the deflection characteristics of the suspension spring 22 by adjusting the position of the stopper 47 which in turn adjusts the position of the spacer 46. More particularly if the stopper 47 is fitted into the lower annular groove 48a of the shock absorber 21, the preload applied to the second helical spring 45 by rotating the knob 36 is reduced accordingly. For example, the position of the annular groove 48a may be so selected that the preload applied to the second helical spring 45 may be zero when the cam seat 33 is moved to its uppermost position by the knob 36. Then, both first and second springs 44 and 45 are compressed until one of the helical springs which is weaker than the other is completely compressed so that as shown in FIGS. 6 and 9, the suspension spring 22 may have different deflection characteristics. On the other hand when the stopper 47 is fitted into the upper annular groove 48c, the preload applied to the second helical spring by the rotation of the knob 36 is increased accordingly so that the suspension spring 22 may have still different deflection characteristics as shown in FIGS. 7 and 10.

Figure 4:
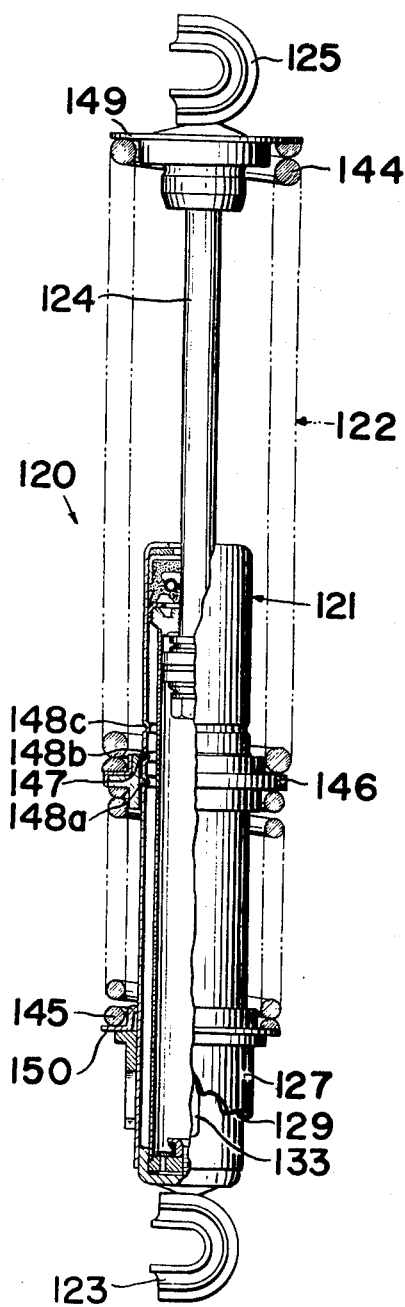
FIG. 4 is a front view, partly in section, of a second embodiment of a rear damper for a motorcycle in accordance with the present invention.

Second Embodiment, FIG. 4

FIG. 4 shows the second embodiment in which the present invention is applied to a rear wheel suspension of the motorcycle. The rear wheel suspension or damper 120 generally comprises a telescopic shock absorber 121 and a suspension spring 122. The rear wheel suspension 120 is interposed between a rear wheel and frame with a bracket 123 at the end of the shock absorber 121 fixed to the rear wheel and a bracket 125 at the upper end of a piston rod 124 fixed to the frame so that the rear wheel may be resiliently suspended from the frame and the oscillation of the suspension spring 122 may be absorbed by the shock absorber 121.

As is the case of the first embodiment, the suspension spring 122 comprises a first helical spring 144 and a second helical spring. The forces of the first and second helical springs 144 and 145 are different. The first and second helical springs 144 and 145 are disposed in series with a spacer 146 interposed therebetween between an upper spring shoe 149 at the upper end of the piston rod 124 and a lower spring show 150 slidably fitted over the shock absorber 121.

A cam 127 having a stopped cam surface 129 is loosely fitted over the shock absorber 121 below the lower spring shoe 150, and a cam seat 133 is fitted over the shork absorber 121 and is made into contact with the stepped cam surface 129 of the cam 127 so that the lower spring shoe 150 is supported by the cam 127 which in turn is supported by the cam seat 133. The spacer 146 is free to move downwardly, but is retained in position against upward movement by a stopper 147 which may be selectively fitted into one of a plurality of annular grooves 148a, 148b and 148c formed in the outer wall of the shock absorber 121.

When the cam 127 is rotated, the relative position of the cam seat 133 with respect to the cam 127 is changed. That is, the cam 127 is vertically displaced together with the lower spring shoe 150 so that the preload applied to the second helical spring 145 loaded between the lower spring shoe 150 and the spacer 146 may be appropriately adjusted. As in the case of the first embodiment, the stopper member 147 may be selectively fitted into one of the annular grooves 148a, 148b and 148c so that the preload applied to the second helical spring 145 may be accordingly increased or decreased when the cam 127 is rotated. The mode of the operation of the second embodiment is substantially similar to that of the first embodiment so that no further description will be made Only the essential features of the present invention has been described so far and it will be understood that various modifications and variations may be effected without departing from the scope of the present invention.

What is claimed is:

1. In a two-wheeled vehicle, a combination comprising a telescopic shock absorber column having spaced ends and inner and outer surfaces, and including a first tubular element and a second element telescoped into said first element;

an annular spacer intermediate said ends of said column freely movable towards and away from one of said ends; and having an annular flange projecting radially of one of said surfaces;

abutment means adjustably positioned in circular grooves on one of said tubular surfaces of said column and operative for preventing movement of said spacer towards and away from the other of said ends;

a helical first spring of a first stiffness located intermediate said spacer and said one end and bearing upon one axial end of said flange;

a helical second spring of a different second stiffness mounted in precompressed condition intermediate said spacer and said other end and bearing upon the opposite axial end of said flange; and adjusting means operative for adjusting the degree of precompression of said helical second spring, said springs being connected with one another in series so that loads tending to telescope said column together cause further compression of said second spring only after substantially complete compression of said first spring has taken place, said adjusting means including a cam portion received in said column and having a stepped cam face facing axially of said column in one direction, and a discrete cam seat portion intermediate one end of said second spring in engagement with said cam face, one of said portions being rotatable relative to the other portion so as to adjust the degree of precompression of said second spring.

2. A combination as defined in claim 1, wherein said spacer is accommodated in said column intermediate the ends thereof, and said abutment means is fixed with and projects into the interior of said column intermediate said ends.

3. A combination as defined in claim 2, wherein said first and second springs are both accommodated in the interior of said column.

4. A combination as defined in claim 3, wherein said cam face faces axially inwardly of said first element, and said cam seat portion is rotatable with reference to said cam portion and has an axial end facing away therefrom and in engagement with a said one end of said second spring.

5. A combination as defined in claim 4, wherein said adjusting means further includes a handle located exteriorly of said first element and operatively connected with said cam seat portion for effecting rotation of the same with reference to said cam face.

6. A combination as defined in claim 4, wherein said first and second springs are coaxial with one another.

7. A combination as defined in claim 1, wherein said spacer surrounds said first element, and said abutment means is provided on said first element intermediate the ends of the latter.

8. A combination as defined in claim 7; and further comprising a pair of stops on said column in the region of the opposite ends thereof, said springs each bearing upon said spacer and upon one of said stops, respectively, and exteriorly surrounding said column.

9. A combination as defined in claim 8, wherein said cam portion and said cam seat portion both surround said column, said cam seat portion being fixed to said column against rotation relative thereto and said cam portion being turnable relative to said column and to said cam seat portion.

10. A combination as defined in claim 9, wherein said springs are coaxial with one another.

11. In a two-wheeled vehicle, a combination comprising a telescopic shock absorber column having spaced ends and an inner surface, and including a tubular first element and a second element telescoped into said first element;

a spacer accommodated in said column intermediate the ends thereof and being freely movable towards and away from one of said ends;

abutment means adjustably positioned on said inner surface and projecting into the interior of said column intermediate said ends for preventing movement of said spacer toward and away from the other of said ends;

a helical first spring of a first stiffness accommodated in said column intermediate said spacer and said end and bearing upon one axial end of said spacer;

a helical second spring of a second stiffness accommodated in said column in precompressed condition intermediate said spacer and said second end and bearing upon the other axial end of said spacer; and adjusting means at said one end and operative for adjusting the degree of precompression of said helical second spring, said spring being connected with one another in series so that loads tending to telescope said column together cause further compression of said second spring only after substantially complete compression of said first spring has taken place, said adjusting means including a portion having a stepped cam face facing axially inwardly of said first element, and a rotatable cam seat in said first element and having one axial end portion in engagement with said stepped cam face and another axial end portion in engagement with a proximal end of said second spring.

12. In a two-wheeled vehicle, a combination comprising a telescopic shock absorber column having spaced ends and including a tubular first element and a second element telescoped into said first element;

a spacer surrounding said column intermediate the ends thereof and being movable towards and away from one of said ends;

abutment means adjustably positioned on said outer surface and projecting outwardly, of said column intermediate said ends for preventing movement of said spacer toward and away from the other of said ends;

a helical first spring surrounding said column intermediate said spacer and said end and having a first stiffness;

a helical second spring surrounding said column in precompressed condition intermediate said spacer and said second end and having a different second stiffness; and adjusting means at said one end and operative for adjusting the degree of precompression of said helical second spring, said springs being connected with one another in series, so that loads tending to telescope said column together cause further compression of said second spring only after substantially complete compression of said first spring has taken place, said adjusting means including a portion having a stepped cam face facing axially inwardly of said first element, and a rotatable cam seat on said first element and having one axial end portion in engagement with said stepped cam face and another axial end portion in engagement with a proximal end of said second spring.

* * * * *